United States Patent [19]
Bemis et al.

[11] Patent Number: 5,891,381
[45] Date of Patent: *Apr. 6, 1999

[54] CO-INJECTION METHOD APPARATUS FOR INJECTION MOLDING

[75] Inventors: Peter F. Bemis, Sheboygan; Steven J. Kolste, Sheboygan Falls; Loren C. Albrecht, Sheboygan; Gerald W. Swart, Sheboygan Falls, all of Wis.

[73] Assignee: Bemis Manufacturing Company, Sheboygan Falls, Wis.

[ * ] Notice: The term of this patent shall not extend beyond the expiration date of Pat. No. 5,650,178.

[21] Appl. No.: 897,459

[22] Filed: Jul. 21, 1997

Related U.S. Application Data

[60] Provisional application No. 60/027,564 Sep. 27, 1996.

Related U.S. Application Data

[63] Continuation-in-part of Ser. No. 344,493, Nov. 23, 1994, Pat. No. 5,650,178.

[51] Int. Cl.⁶ .................................................. B29C 45/23
[52] U.S. Cl. ...................... 264/328.8; 425/130; 425/562; 425/564; 425/570; 425/572
[58] Field of Search ..................................... 425/130, 562, 425/563, 564, 565, 566, 570, 572; 264/328.8

[56] References Cited

U.S. PATENT DOCUMENTS

| | | | |
|---|---|---|---|
| 4,381,272 | 4/1983 | Ehritt | 264/40.3 |
| 4,775,308 | 10/1988 | Schad et al. | 425/130 |
| 5,040,963 | 8/1991 | Beck | 425/130 |
| 5,149,547 | 9/1992 | Gill | 425/564 |
| 5,200,207 | 4/1993 | Akselrud et al. | 425/557 |
| 5,221,507 | 6/1993 | Beck | 264/255 |
| 5,238,378 | 8/1993 | Gellert | 425/130 |
| 5,383,257 | 1/1995 | Krauss | 24/625 |
| 5,417,558 | 5/1995 | Heindel et al. | 425/145 |
| 5,466,141 | 11/1995 | Eckardt et al. | 425/130 |
| 5,523,045 | 6/1996 | Kudert et al. | 264/513 |
| 5,531,581 | 7/1996 | Donnel | 425/145 |
| 5,556,582 | 9/1996 | Kazmer | 425/573 |
| 5,595,799 | 1/1997 | Beck et al. | 428/35.7 |
| 5,599,568 | 2/1997 | Donnell | 425/562 |
| 5,601,773 | 2/1997 | Schmidt et al. | 264/328.8 |
| 5,650,178 | 7/1997 | Bemis et al. | 425/130 |

*Primary Examiner*—Tim Heitbrink
*Attorney, Agent, or Firm*—Michael Best & Friedrich LLP

[57] ABSTRACT

Injection molding apparatus including a first mold cavity having an inlet, a second mold cavity having an inlet, a source of a first material to be injected, a source of a second material to be injected, and a co-injection manifold including a nozzle housing including a first outlet adapted to communicate with the first mold cavity inlet, a second outlet adapted to communicate with the second mold cavity inlet, first and second spaced apart inlets respectively adapted to communicate with the first and second sources of material to be injected, a first passageway communicating between the first inlet and the first and second outlets, and a second passageway communicating between the second inlet and the first and second outlets.

22 Claims, 8 Drawing Sheets

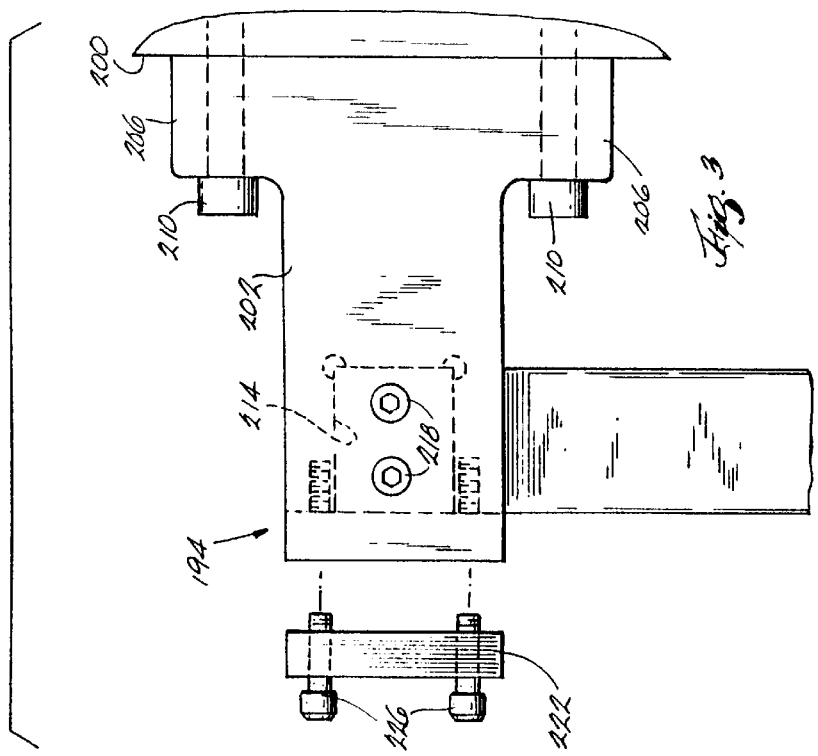
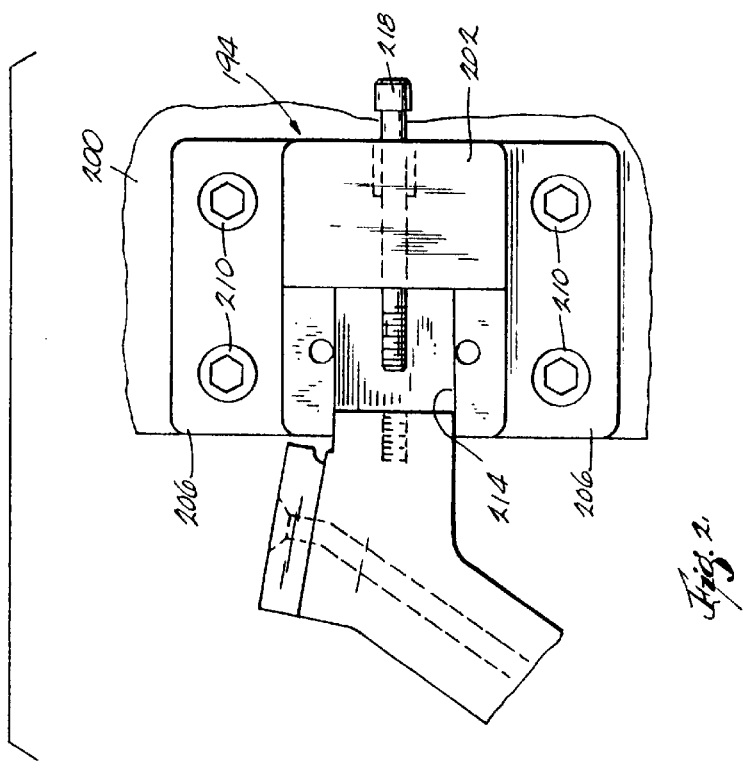

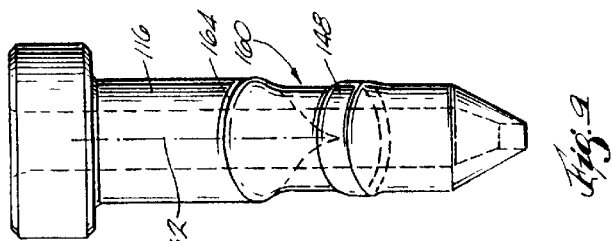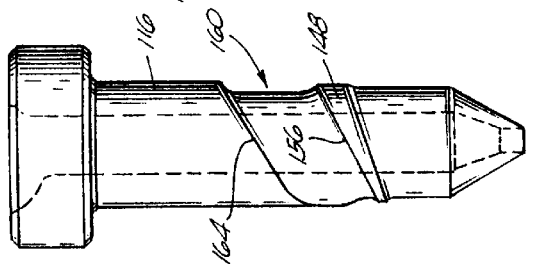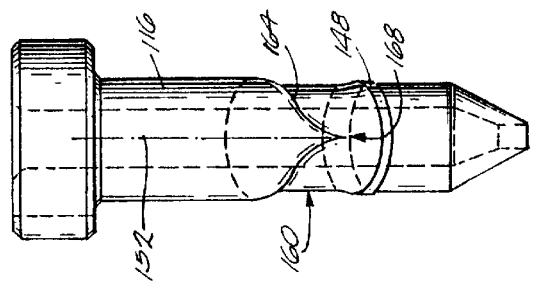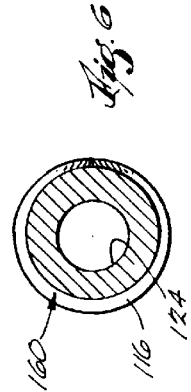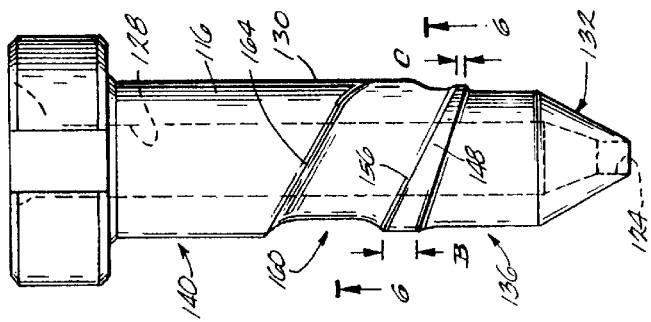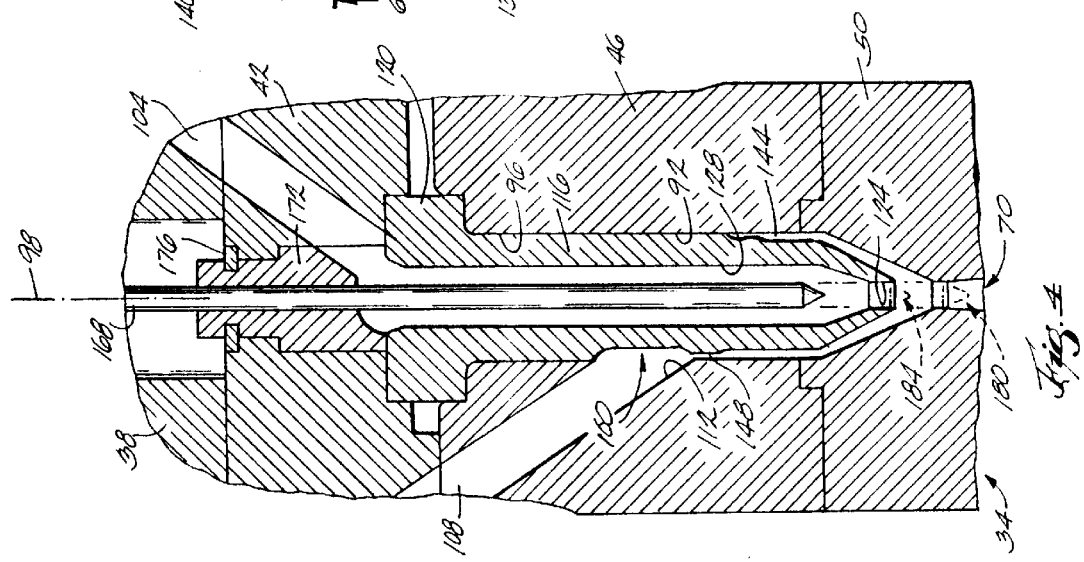

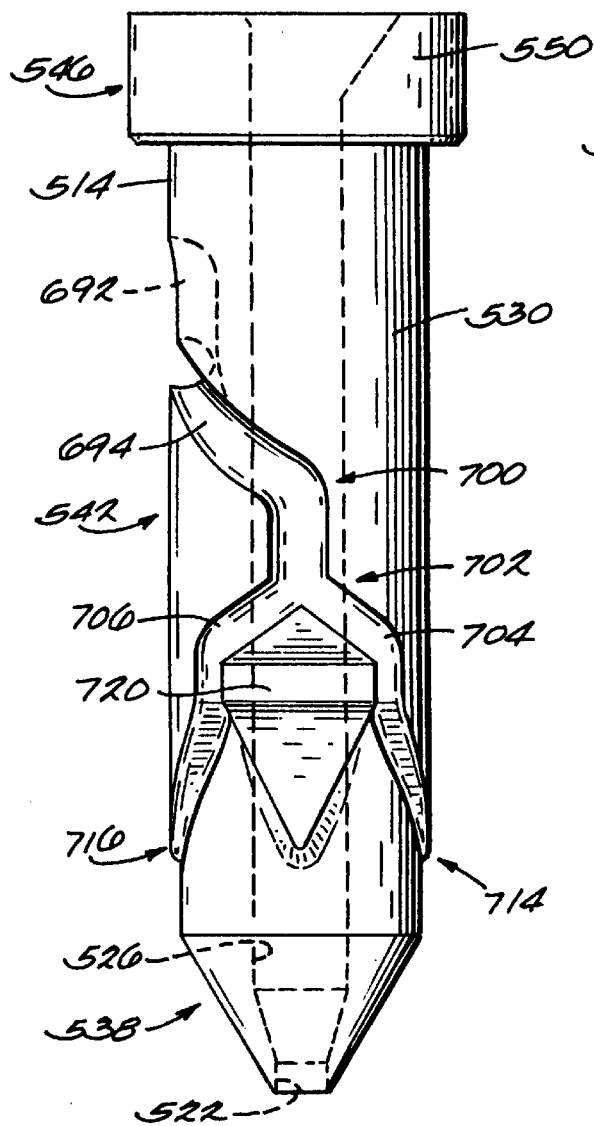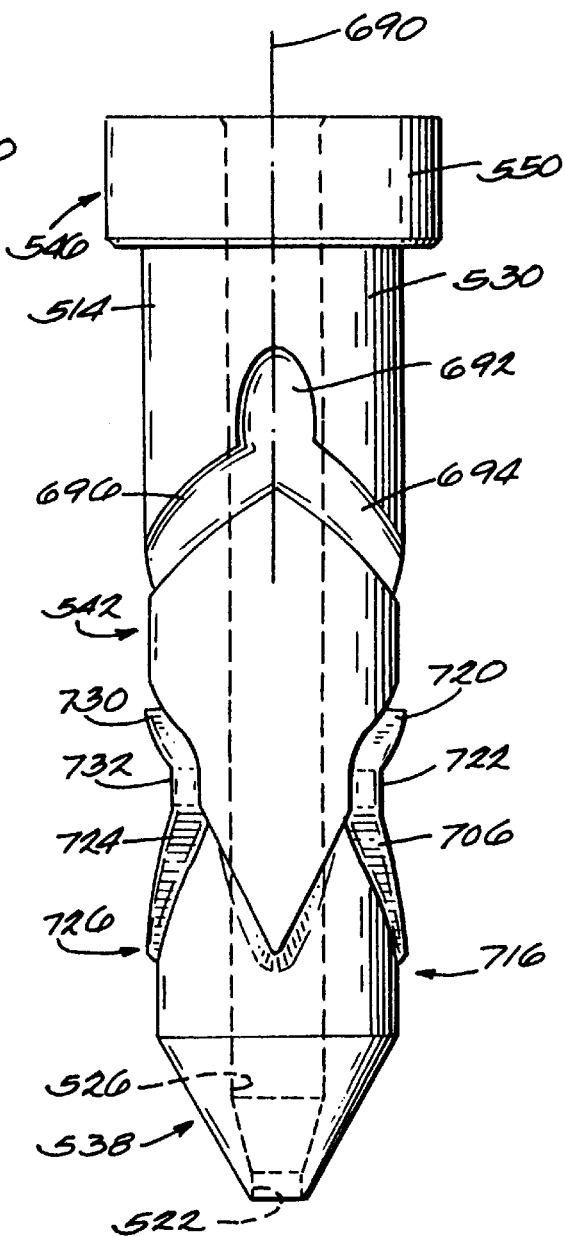

CO-INJECTION METHOD APPARATUS FOR INJECTION MOLDING

RELATED APPLICATIONS

This is a continuation-in-part of U.S. patent application Ser. No. 08/344,493, filed Nov. 23, 1994, now U.S. Pat. No. 5,650,178. This application also claims the benefit under 35 U.S.C. §119 of co-pending U.S. Provisional patent application Ser. No. 60/027,564, filed Sep. 27, 1996.

BACKGROUND OF THE INVENTION

The invention relates to injection molding apparatus, and more particularly to co-injection apparatus, i.e., apparatus for injecting two different materials, typically an inner core material and an outer skin material, into a single or multi-cavity mold cavity.

A co-injection manifold receives material, usually plastic, from two different injection units and combines the two materials into a single stream that flows into a mold or die. The co-injection manifold is thus located between the injection units and the mold. A typical co-injection manifold is fixed to the injection units.

U.S. Pat. No. 4,376,625 discloses a co-injection manifold mounted on an injection unit. Another injection unit communicates with the co-injection manifold via a tube. The manifold has a forwardly opening outlet, an annular port axially behind or upstream of the outlet, and a central port axially behind or upstream of the annular port. One injection unit communicates with the central port, and the other injection unit communicates with the annular port. A valve member is movable between a fully forward position blocking both of the ports, an intermediate position blocking only the central port, and a rearward position clear of both ports. In the fully forward position, no material flows through the outlet. In the intermediate position, only material from the annular port flows through the outlet. In the rearward position, both material from the annular port and material from the central port flow through the outlet.

SUMMARY OF THE INVENTION

The invention provides improved co-injection apparatus.

Among other things, the invention provides an improved co-injection manifold. The co-injection manifold comprises a nozzle housing including an outlet in the forward end of the housing. First and second spaced apart inlets are located in the rearward end of the housing and are respectively adapted to communicate with first and second injection nozzles. The first nozzle provides the inner core material and the second nozzle provides the outer skin material. The housing has therein a generally cylindrical bore centered on an axis extending from forward to rearward. The forward downstream end of the bore communicates with the housing outlet, a first passageway communicates between the first inlet (the core inlet) and the rearward upstream end of the bore, and a second passageway communicates between the second inlet (the skin inlet) and the bore via an opening intermediate the upstream and downstream ends of the bore.

Preferably, the passageways have no turns with an angle greater than forty degrees, and each passageway intersects the bore at an angle of no more than forty degrees. More particularly, in the preferred embodiment of the invention, each passageway has only one turn, that turn having an angle of approximately twenty-five degrees, and each passageway intersects the bore at an angle of approximately thirty-five degrees. The lack of sharp turns and the minimal number of turns provides a significant advantage over the known prior art. When a typical plastic material used in injection molding flows around a sharp turn, the material on the inside of the turn often flows very slowly or not at all. This can expose the material on the inside of the turn to excessive heat, or to heat for too long a time period, which can lead to carbonization of the material, causing defective molded parts. Eliminating sharp turns avoids this problem, resulting in higher-quality parts.

A nozzle member is housed in the bore, the nozzle member having a forward end which is spaced rearwardly from the nozzle housing outlet and which has therein an outlet port. The nozzle member has therein a central bore extending along the axis and communicating between the first passageway (the core passageway) and the nozzle member outlet port. The nozzle member and the nozzle housing define therebetween an annular passageway surrounding the central bore and the outlet port and communicating between the second passageway (the skin passageway) and the outlet. The outer surface of the nozzle member is shaped to provide evenly distributed flow of skin material through the annular passageway and around the core material. By providing a controlled and uniform thickness of the skin material, the percentage of the core material can be maximized without the typical shadowing or bursting-through of the core material to the part surface. The nozzle member can be easily removed and replaced with a nozzle member specifically designed for certain materials. A variety of material melt viscosities can therefore be used with the manifold.

A valve pin extends through the central bore of the nozzle member. The pin is moveable between a forward position wherein the pin extends into and closes both the nozzle member outlet port and the nozzle housing outlet (so neither material flows through the outlet), an intermediate position wherein the valve pin is spaced from the nozzle housing outlet and extends into and closes the nozzle member outlet port (so only skin material flows through the outlet), and a rearward position wherein the valve pin is spaced from both the nozzle housing outlet and the nozzle member outlet port (so both skin material and core material flow through the outlet).

The design of the manifold provides a clean entry and exit of the core material into the melt stream of the outer skin material. In other words, the starting and stopping of the flow of core material is abrupt, thereby not cross-contaminating the outer skin material. The advantage is that gates show very little, if any, evidence of the core material. Also, because flow of core material into the mold is stopped before the mold is filled, only outer skin material is left in the manifold nozzle after the mold is filled. Because the core material is stopped cleanly there is no core material in the leading edge of material left in the manifold, which material forms the leading edge of material for the next part to be made. Because no core material is visible on the part surface, the core material can be significantly different from the outer skin material. This is a significant advantage over known systems which are not designed to completely encapsulate the core material.

The co-injection manifold of U.S. Pat. No. 4,376,625 provides some of these features but has a significant disadvantage when compared to the co-injection manifold of the invention. The manifold of U.S. Pat. No. 4,376,625 has a central bore for the core material, and the outer skin material flows through an annular passageway surrounding the central bore. The outer skin material flows to the annular passageway through four separate passageways 12. This requires four separate melt flows to merge into a single flow in the annular passageway. The result is material knitlines visible on the part surface. This can be an aesthetic problem and can cause a weak area in the skin. The manifold of the invention does not have these problems because the outer skin material flows to the annular passageway through a single passageway.

The manifold is mounted to the machine sled in a manner that allows the user to purge the injection units or nozzles without having the material go through the manifold. This is advantageous in instances where the material has become contaminated or when abrasive purge compounds are needed.

Another advantage of the mounting of the manifold is that the injection units can easily be retracted from the manifold without disassembly. Known manifolds are mounted directly to the injection units so that any changes to screen packs, nozzle configurations, shut-offs or screws requires removal of the manifold. The manifold of the invention allows one or both screws to be backed off without disassembly.

The manifold is mounted so that it can easily be rotated 180°. This is a significant advantage when two different size barrels are used, as is common.

The invention also provides an improved apparatus that can be used for co-injection with multi-cavity molds and with molds having a single cavity and multiple injection ports or gates. The invention also has several features which permit the use of high-grade, engineered plastics in co-injection applications. For a variety of reasons, such materials were considered to be unsuitable for co-injection applications. However, the present invention permits use of such materials to produce a wide variety of superior products with increased manufacturability.

In particular, the invention provides a co-injection apparatus for conducting multiple flows of molten plastic material to a mold having multiple injection ports. The apparatus includes a manifold adapted to communicate with multiple sources of differing molten plastics, such as a pair of injection units generating flows of a first material and of a second material. The manifold has a pair of inlets for respectively receiving one of the flows of plastic material from an injector unit and has a pair of passages, one extending from each inlet, for conducing the flows of molten material. The passages in the manifold divide into multiple passage portions, each of which terminates in an outlet. The passage portions conducting the first plastic material terminate in manifold outlets which are located in proximity to manifold outlets of passage portions conducting the second plastic material. In short, the manifold conducts the two differing plastic materials along separated paths from the injection unit to multiple pairs of manifold outlets at which a flow of the first material and a flow of the second material exit the manifold in close proximity to each other.

The apparatus also includes at least a pair of nozzle housings mounted on the manifold, with each nozzle housing being associated with a respective injection mold port. The nozzle housings are operable to combine the flows of the first and second materials into a single flow immediately prior to introduction of the flows to the mold.

Each of the nozzle housings includes first and second spaced apart nozzle inlets that are located in the rearward end of the nozzle housing and that are adapted to communicate with respective manifold passage outlets so as to receive a flow of the first or second plastic material. Each nozzle housing also includes a nozzle outlet that communicates with the nozzle passages in a manner discussed below and that communicates with an injection port in the injection mold.

Each nozzle housing also has therein a generally cylindrical bore. The forward, downstream end of the bore communicates with the nozzle housing outlet. The nozzle housing also includes a first nozzle passageway that communicates between one nozzle inlet and the bore. The nozzle housing also includes a second nozzle passageway that communicates between the second nozzle inlet and the bore via an opening intermediate the upstream and downstream ends of the nozzle bore.

The nozzle housing also includes a nozzle member which is housed in the bore, which has a forward end spaced rearwardly from the nozzle housing outlet, and which has therein an outlet port at the forward end. The nozzle member also has therein a central bore extending along the length of the nozzle member and communicating between the first nozzle passageway and the nozzle member outlet port. The nozzle member and the nozzle housing define therebetween an annular passageway that generally surrounding the central bore and the outlet port and communicating between the second nozzle passageway and the outlet. The outer surface of the nozzle member is shaped to provide an evenly distributed flow of material through the passageway and around the material flow exiting the central bore in the nozzle member. By providing a controlled and uniform thickness of the outer skin material, the percentage of the plastic material used for the core material in the co-injection application can be maximized without the typical shadowing or bursting-through of the core material to the part surface.

The nozzle member can be easily removed and replaced with a nozzle member specifically designed for certain materials. A variety of material melt viscosities can therefore be used with the manifold.

The apparatus also includes respective valve pin assemblies associated with the nozzle housings to control passage of the flows of the first and second materials through the nozzle housing outlets. The valve pin assemblies are independently operable so that the flows of the first and second plastic materials can be varied from nozzle housing to housing and, therefore, from injector port to injector port.

One of the advantages achieved by the provision of such an apparatus having multiple, independently controllable nozzle housings or "drops" is that the apparatus can be used in association with either single cavity injection molds having multiple injection ports as well as with multiple cavity molds having one or more injector ports communicating with the cavities. The apparatus can also be used with multiple cavities having different sizes and/or shapes. The flexibility afforded by the introduction of flows of different molten materials by means of independently controllable valves permits the apparatus to be used to produce a wide range of products made by co-injection. For example, the apparatus can make some products of only outer skin or A material, while at the same time making some products of both A material and inner core or B material.

The apparatus also provides a means for conducting at least two flows of differing materials to multiple injector ports and for introducing the flows to the injector ports so that the materials are successfully co-injected. As explained above, in one embodiment of the invention, the apparatus includes separate passages for conducting flows of molten material from the injector units, and each passage divides into passage portions which ultimately lead to different injection ports.

One of the advantages achieved by conducting separated flows of materials through distinct passages to a nozzle housing assembly is the ability of the apparatus to conduct a flow of homogeneous plastic material in conjunction with the flow of a second material to an injector port that may be remotely located relative to the manifold or to other injector ports. This is particularly advantageous in applications in which the mold design dictates that the path to be followed by the mold portions is tortuous.

The invention also provides a co-injection apparatus including a nozzle member that provides a uniform, steady flow of plastic material through the nozzle housing. As discussed above, the nozzle provides an outer surface and an internal bore. The internal bore conducts a flow of material from one of the manifold outlets to the nozzle member outlet. This flow of material becomes the "core" material of the co-injected product. The core material flow passes through the interior of the nozzle member and, when the valve pin assembly so permits, becomes surrounded by the flow of the second or "skin" material. The skin material flow passes through the nozzle passage and into the space between the outer surface of the nozzle member and the nozzle housing bore. The outer surface of the nozzle member, in cooperation with the nozzle housing bore in which the nozzle member is located, guides a flow of skin material from the nozzle housing passage into surrounding relation with the flow of core material that is conducted along and exits the nozzle member. More particularly, the nozzle member produces an outer flow of material that has an annular cross section in the plane lying normal to the direction of the flow. The nozzle helps to create a flow of plastic that has uniform wall thickness both radially about any normal cross section of the flows but also along the length of the flow as the flow surrounds the second flow exiting the nozzle member bore.

Other features and advantages of the invention will become apparent to those skilled in the art in view of the following detailed description, claims and drawings.

DESCRIPTION OF THE DRAWINGS

FIG. 2 is an enlarged portion of FIG. 1 with the cover plate removed from the mounting column.

FIG. 3 is an exploded view of the right side of the mounting column shown in FIG. 2.

FIG. 4 is an exploded portion of FIG. 1.

FIG. 5 is an enlarged top plan view of the nozzle member.

FIG. 6 is a view taken along lines 6—6 in FIG. 5.

FIG. 7 is a reduced view of the right side of the nozzle member as seen in FIG. 5.

FIG. 8 is a view similar to FIG. 7 showing the bottom of the nozzle member as seen in FIG. 5.

FIG. 9 is a view similar to FIG. 7 showing the left side of the nozzle member as seen in FIG. 5.

FIG. 14 is an enlarged bottom plan view of the nozzle member shown in FIG. 13.

FIG. 15 is a view showing the side of the nozzle member as seen in FIG. 14.

Figure 1:
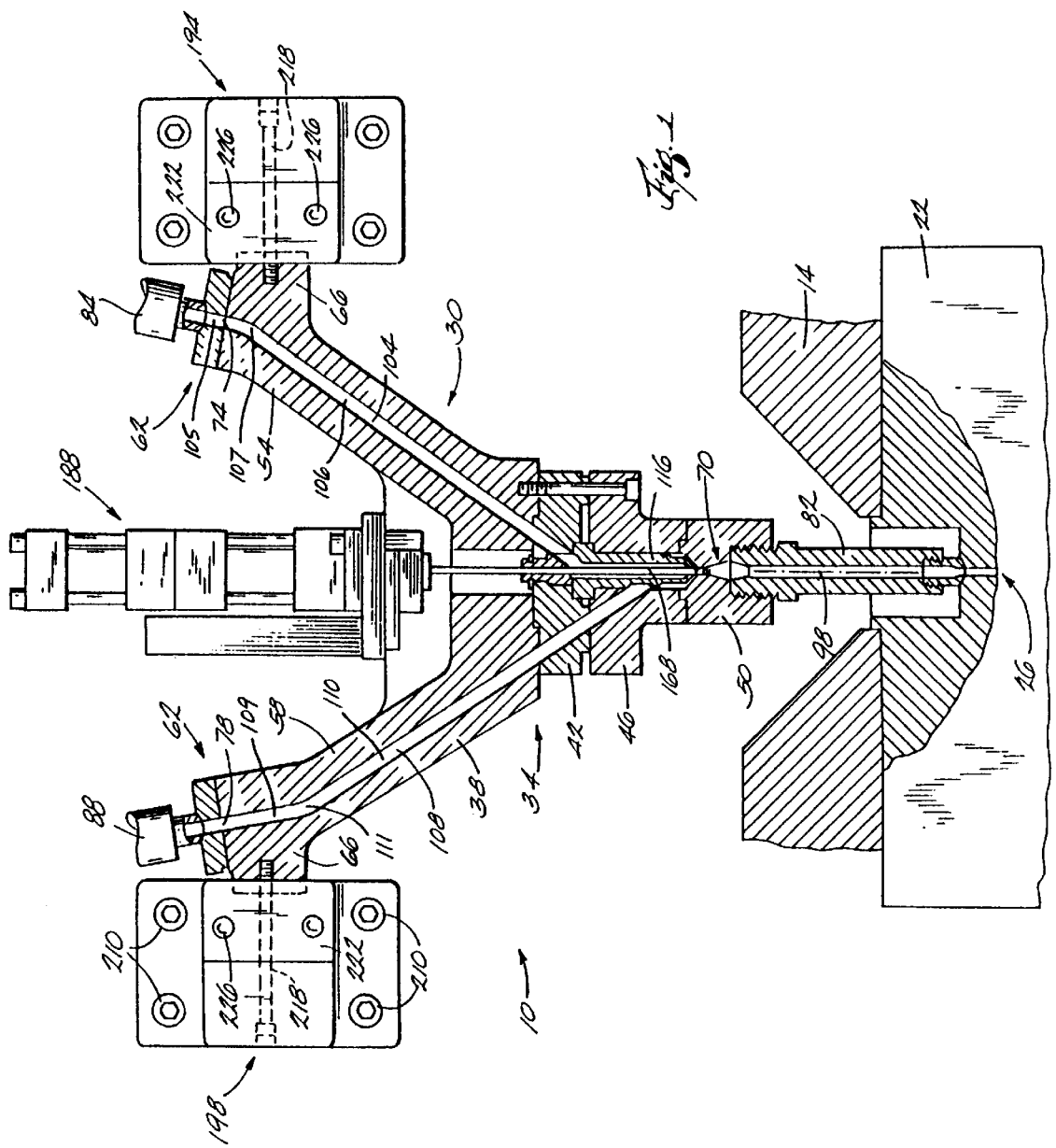
FIG. 1 is a top plan view, partially in section, of an injection molding apparatus embodying the invention.
Figure 10:
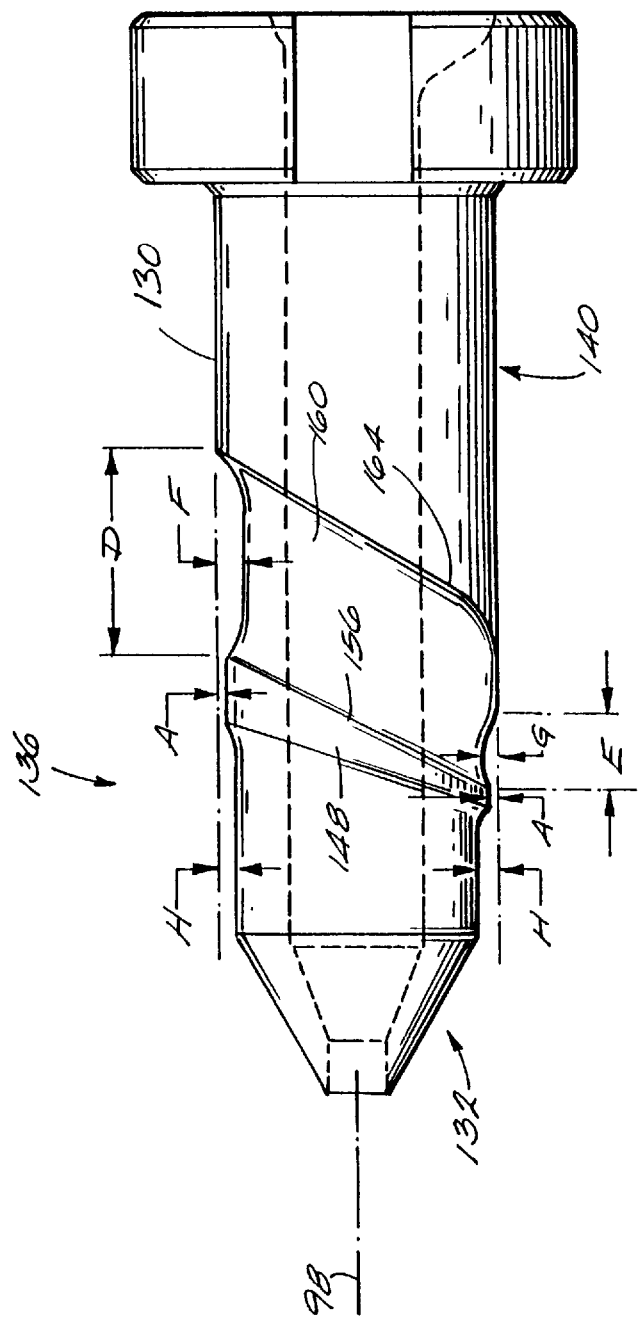
FIG. 10 is the same as FIG. 5 but enlarged.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An injection molding apparatus 10 embodying the invention is illustrated in FIGS. 1 through 10. The apparatus 10 comprises a platen 14. A mold or die 22 (see FIG. 1) is fixed to the platen 14. Any suitable means can be used to secure the die 22 to the platen 14. The die 22 defines a mold cavity having an inlet 26.

The apparatus 10 also comprises (see FIG. 1) a co-injection manifold 30 mounted relative to the platen 14. The manner in which the manifold 30 is mounted is described below. The co-injection manifold 30 comprises a nozzle housing 34 having forward and rearward ends. While the illustrated housing 34 includes four portions 38, 42, 46 and 50 fixed together, it should be understood that the housing 34 can be made of any number of portions or a single portion. The nozzle housing 34 is generally V-shaped and includes angularly spaced first and second or right and left arms 54 and 58. Each arm has a rearward end 62 and includes an outwardly extending mounting portion 66. The nozzle housing 34 has an outlet 70 in its forward end, a first inlet 74 in the rearward end of the first arm 54, and a second inlet 78 in the rearward end of the second arm 58. The outlet 70 is located on a horizontal axis extending from the forward to rearward. The outlet 70 communicates with a nozzle 82 that communicates with the mold cavity inlet 26. The inlets 74 and 78 communicate with injection nozzles 84 and 88 of respective injection units (not shown). In the illustrated construction, the injection nozzle 84 injects the inner core material and the nozzle 88 injects the outer skin material.

The nozzle housing 34 includes (see FIG. 4) a generally cylindrical inner surface 92 defining a bore 96 that is centered on an axis 98 and that communicates with the outlet 70. The bore 96 has a rearward upstream end (the upper end in FIG. 4) and a forward downstream end (the lower end in FIG. 4). The majority of the bore 96 has a cross-sectional area substantially greater than the cross-sectional area of the outlet 70, and the forward end of the bore 96 is frustoconical such that the bore 96 tapers down to the outlet 70. The nozzle housing 34 also defines (see FIGS. 1 and 4) a first passageway 104 communicating between the first inlet 74 and the upstream end of the cylindrical bore 96. The first passageway includes an upstream portion 105 communicating with the inlet 74, and a downstream portion 106 communicating with the bore 96. The upstream and downstream portions 105 and 106 meet at a turn 107 having an angle of approximately twenty-five degrees. The housing 34 also defines a second passageway 108 communicating between the second inlet 78 and the bore 96. The second passageway 108 communicates with the bore 96 through a second passageway opening 112 (see FIG. 4) located intermediate the opposite ends of the bore 96. The second passageway includes an upstream portion 109 communicating with the inlet 78, and a downstream portion 110 communicating with the bore 96. The upstream and downstream portions 109 and 110 meet at a turn 111 having an angle of approximately twenty-five degrees. The first passageway 104 extends in large part through the first arm 54 of the housing 34, and the second passageway 108 extends in large part through the second arm 58 of the housing 34. Both of the passageways 104 and 108, and specifically the downstream portions thereof, intersect the bore 96 at an angle of approximately thirty-five degrees. This facilitates material flow from the passageways 104 and 108 into the bore 96. Also, as explained above, minimizing the number of turns and eliminating sharp turns results in fewer defective parts.

The manifold 30 also comprises (see FIGS. 1 and 4–10) a nozzle member 116 housed in the bore 96. The rearward end of the nozzle member 116 has thereon (see FIG. 4) an annular flange 120 captured between the housing portions 42 and 46 to secure the member 116 in the bore 96. The forward end of the nozzle member 116 is spaced rearwardly from the nozzle housing outlet 70 and has therein (see FIGS. 4 and 5) an outlet port 124 centered on the axis 98. In the illustrated construction, the port 124 has a diameter of 0.250 inch. The nozzle member 116 has therein a central bore 128 extending along the axis 98. In the illustrated construction, the bore 128 has an inside diameter of 0.559 inch. The forward end of the central bore 128 is tapered at an angle of forty degrees and communicates with the nozzle member outlet port 124. The rearward end of the central bore 128 communicates with the downstream end of the first passageway 104.

The nozzle member 116 has (see FIGS. 5 and 10) an outer surface 130 divided into three sections: the forward section 132; the middle section 136; and the rearward section 140. The forward section 132 is located in the frustoconical portion of the housing bore 96 (see FIG. 4) and is tapered at an angle of sixty degrees. The rearward section 140 extends rearwardly from the second passageway opening 112 in the bore 96. The middle section 136 extends between the forward and rearward sections. The rearward section 140 of the outer surface 130 is generally cylindrical and has a diameter substantially equal to the diameter of the nozzle housing inner surface 92 such that there is a tight fit between the nozzle housing 34 and the rearward section 140. In the illustrated construction, the diameter of the rearward section 140 is 1.199 inch. As shown in FIG. 4, the middle and forward sections are spaced from the inner surface 92 of the nozzle housing 34 so as to define an annular passageway 144 which communicates between the second passageway 108 and the nozzle housing outlet 70 and which has a downstream end surrounding the outlet port 124.

The middle section 136 of the nozzle member outer surface 130 includes (see FIGS. 5 and 7–10) a land 148 having an outer surface forming a portion of a cylinder centered on the axis 98, i.e., the land 148 is spaced the same distance from the nozzle housing inner surface 92 around the entire circumferential extent of the land 148. In the illustrated construction, the land 148 has an outer diameter of 1.119 inch, and the outer surface of the land 148 is spaced (see reference letter "A" in FIG. 10) 0.040 inch from the nozzle housing inner surface 92. The land 148 is located immediately downstream of or forward of the second passageway opening 112. The land 148 is symmetrical about a plane (indicated by reference numeral 152 in FIGS. 7 and 9 and the plane of the paper in FIG. 4) which includes the axis 98 and which extends through the second passageway opening 112. The land 148 has an axial length (in the forward-rearward direction) that decreases in a direction circumferentially away from the second passageway opening 112. In other words, the longest part of the land 148 is on the side of the nozzle member 116 adjacent the second passageway opening 112, and the shortest part of the land 148 is on the side of the nozzle member 116 opposite the second passageway opening 112. Specifically, in the illustrated construction, the land 148 has an axial length B (see FIG. 5) of 0.280 inch adjacent the second passageway opening 112 and has an axial length C (see FIG. 5) of 0.063 inch opposite the second passageway opening 112. The upstream edge 156 of the land 148 extends forwardly or toward the outlet 70 (downwardly in FIG. 5) in the direction circumferentially away from the second passageway opening 112.

The middle section 136 of the nozzle member outer surface 130 has therein (see FIGS. 4, 5 and 7–10), rearwardly of the land 148 and in axial alignment with the second passageway opening 112, a groove 160 symmetrical about the plane 152. Like the land 148, the groove 160 has an axial length that decreases in a direction circumferentially away from the second passageway opening 112. In the illustrated construction, the groove 160 has an axial length D (see FIG. 10) of 0.907 inch adjacent the second passageway opening 112 and has an axial length E (see FIG. 10) of 0.287 inch opposite the second passageway opening 112. Unlike the land 148, the groove 160 is not spaced the same distance from the nozzle housing inner surface 92 around the entire circumferential extent of the groove 160. Instead, the groove 160 has a depth that decreases in a direction circumferentially away from the second passageway opening 112. That is, the depth of the groove 160 is greatest on the side of the nozzle member 116 adjacent the second passageway opening 112 and is least on the side of the nozzle member 116 opposite the second passageway opening 112. In the illustrated construction, the groove 160 has a depth F (see FIG. 10) of 0.120 inch adjacent the second passageway opening 112 and has a depth G (see FIG. 10) of 0.060 inch opposite the second passageway opening 112. Also, as shown in FIGS. 5 and 7–10, the upstream edge 164 of the groove 160 extends forwardly or toward the outlet 70 in a direction circumferentially away from the second passageway opening 112, and the portions of the upstream edge 164 on the opposite sides of the nozzle member 116 converge forwardly to a point 168 (see FIG. 7). Consequently, material flowing around the opposite sides of the nozzle member 116 in the groove 160 is directed forwardly toward the land 148 on the side of the nozzle member 116 opposite the second passageway opening 112. Forward or downstream of the land 148, the middle section 136 is cylindrical and is, in the illustrated construction, spaced 0.065 inch from the nozzle housing inner surface 92. This spacing is indicated by reference letter "H" in FIG. 10.

This construction of the groove 160 and the land 148 creates a relatively even flow of material over the land 148 around the entire circumferential extent thereof. The land 148 is longest and the groove 160 is deepest adjacent the second passageway opening 112 because the material flowing from the second passageway 108 is under the greatest pressure at this point. The groove 160 is most shallow and the land 148 is shortest on the side of the nozzle member 116 opposite the second passageway opening 112 because material flowing around the nozzle member 116 is under the least pressure on the opposite side of the nozzle member 116. After flowing over the land 148, the material continues to flow through the annular passageway 144 defined between the nozzle member 116 and the nozzle housing inner surface 92 until the material reaches the nozzle housing outlet 70.

It should be noted that the nozzle housing 34 and the nozzle member 116 can be viewed as a single housing defining the outlet 70, the central bore 128, and the annular passageway 144. The nozzle housing inner surface 92 and the land 148 define, in the annular passageway 144, an annular orifice with an axial length that decreases in a direction circumferentially away from the second passageway opening 112. The upstream edge of the annular orifice (the upstream edge 156 of the land 148) extends toward the outlet 70 (downwardly in FIGS. 4 and 5) in the direction circumferentially away from the second passageway opening 112.

The manifold 30 also comprises (see FIGS. 1 and 4) a valve pin 168 extending through the nozzle member central bore 128. The pin 168 is supported relative to the housing 34 by (see FIG. 1) a pin bushing 172 secured relative to the housing 34 by a clamp 176. The valve pin 168 is moveable (see FIG. 4) between a forward position (indicated by reference numeral 180 in FIG. 4), an intermediate position (indicated by reference numeral 184 in FIG. 4), and a rearward position (shown in solid lines in FIG. 4). In the forward position, the valve pin 168 extends into and closes both the nozzle member outlet port 124 and the nozzle housing outlet 70, so that neither the outer skin material nor the inner core material flows through the nozzle housing outlet 70. In the intermediate position, the valve pin 168 is spaced from the nozzle housing outlet 70 but extends into and closes the nozzle member outlet port 124, so that only the outer skin material (which flows between the nozzle housing 34 and the outer surface 130 of the nozzle member 116) flows through the nozzle housing outlet 70. In the rearward position, the valve pin 168 is spaced rearwardly from both the nozzle housing outlet 70 and the nozzle member outlet port 124, so that the core material flows through the nozzle member outlet port 124 and through the nozzle housing outlet 70, and the outer skin material flows around the nozzle member 116 and surrounds the core material as both materials flow through the nozzle housing outlet 70. The valve pin 168 is moved relative to the housing 34 by a conventional hydraulic cylinder 188 (see FIG. 1) mounted on the manifold 30.

The manner in which the manifold 30 is mounted will now be described. As shown in FIGS. 2 and 3, the mounting portion 66 of the first arm 54 extends into and is supported by a first mounting column 194, and the mounting portion 66 of the second arm 58 extends into and is supported by a second mounting column 198. The mounting columns are fixedly mounted on the horizontal surface 200 of a machine base sled positioned relative to the platen 14. The mounting columns are mirror images of each other, and only the first mounting column 194 will be described in detail.

The mounting column 194 includes a central portion 202 having thereon forward and rearward base flanges 206. Each flange 206 has therethrough two screws or bolts 210 securing the mounting column 194 to the surface 200. The central portion 202 of the mounting column 194 defines an inwardly opening, generally rectangular seat 214 which houses the nozzle housing mounting portion 66. A pair of bolts or screws 218 extend horizontally through the mounting column central portion 202 and are threaded into the nozzle housing mounting portion 66. A cover plate 222 extends over the nozzle housing mounting portion 66 to further secure the mounting portion 66 relative to the mounting column 194. The cover plate 222 is fixed to the central portion 202 by a pair of vertically extending bolts or screws 226.

In order to move the nozzle housing 34 relative to the mounting column 194, the cover plate 222 must be removed and the bolts 218 must be unthreaded from the mounting portion 66. When both arms 54 and 58 of the nozzle housing 34 are disconnected from their respective mounting columns 194 and 198, the nozzle housing 34 can be rotated 180° about the axis 98, the first arm 54 can be secured to the second mounting column 198, and the second arm 58 can be secured to the first mounting column 194. The first inlet 74 then communicates with the second injection nozzle 88 and the second inlet 78 communicates with the first injection nozzle 84.

The molding apparatus 10 operates as follows. The nozzle housing 34 is oriented as shown in FIG. 1, so that the injection nozzle 84 provides the inner core material and the injection nozzle 88 provides the outer skin material. The injection process begins with the valve pin 168 in the intermediate position, so that only the outer skin material goes through the nozzle 82. The outer skin material is injected into the die to form a skin in the mold cavity. The valve pin 168 is then moved to the rearward position, so that both the outer skin material and the inner core material flow through the nozzle 82, with the inner core material inside the outer skin material. After the die is nearly filled, the valve pin 168 is moved back to the intermediate position. This terminates flow of the inner core material and allows the outer skin material to cover the inner core material left in the gate area of the die. Once the die is "packed," the valve pin 168 is moved to the forward position to shut off the flow of both materials and to "freeze off" the gate.

Figure 11:
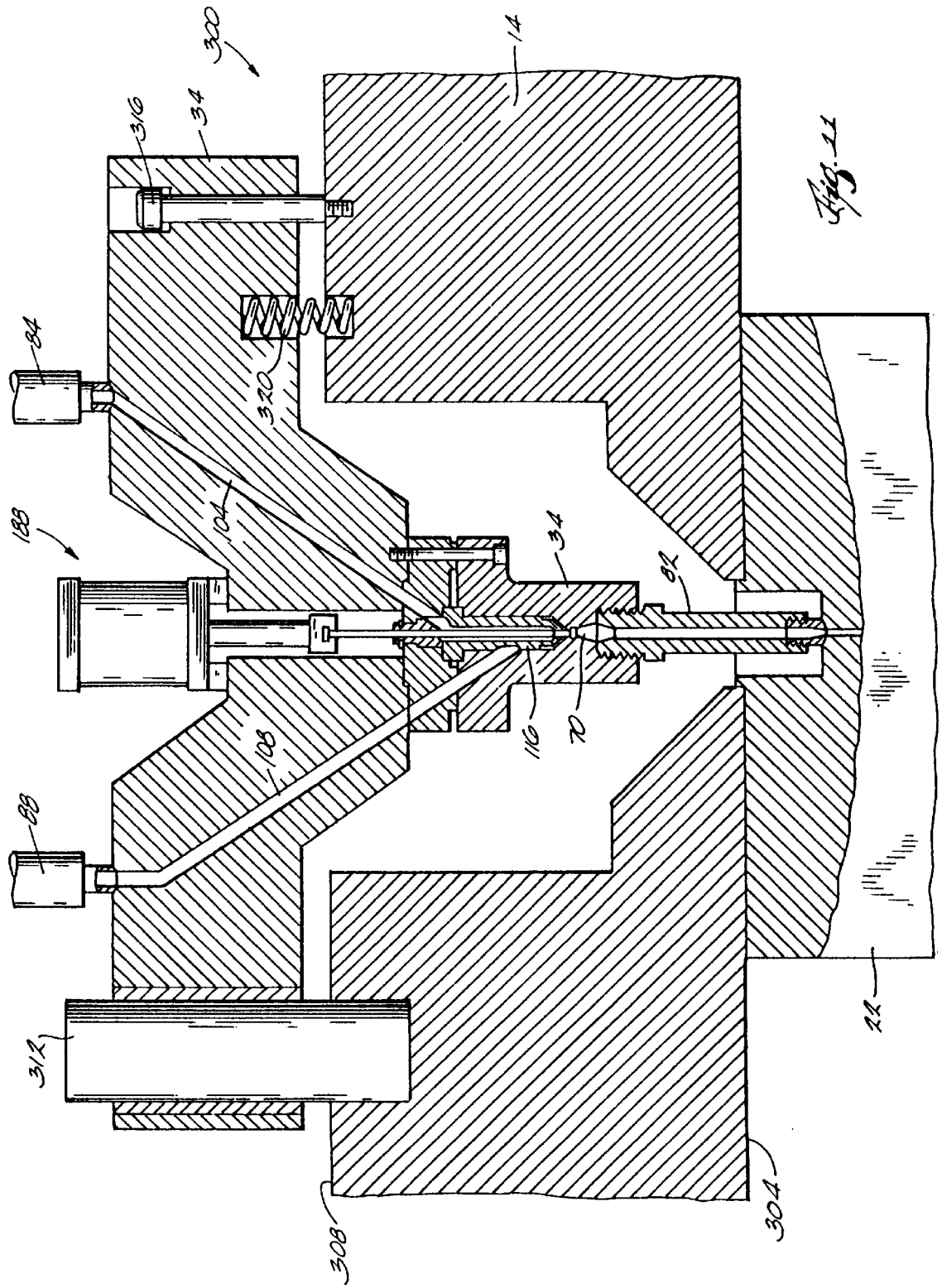
FIG. 11 is a top plan view, partially in section, of an injection molding apparatus that is an alternative embodiment of the invention.

An injection molding apparatus 300 that is an alternative embodiment of the invention is illustrated in FIG. 11. Elements that are identical to elements of the apparatus 10 have been given the same reference numerals.

In the apparatus 300, the platen 14 has opposed generally vertical surfaces 304 and 308, and the die 22 is mounted on the surface 304. The nozzle housing 34 is mounted on the opposed surface 308 of the platen 14 and is biased away from the mold cavity inlet 26 such that the nozzle housing 34 is moveable toward the mold cavity inlet 26 and against the biasing force to move the nozzle housing outlet 70 into communication with the mold cavity inlet 26. A plurality of guide posts 312 (only one is shown in FIG. 11) extend horizontally from the platen surface 308, and the nozzle housing 34 is slidably supported by the posts 312 for horizontal movement relative to the platen 14. A plurality of shoulder bolts 316 (only one is shown in FIG. 11) limit movement of the nozzle housing 34 in the direction away from the platen surface 308. A plurality of springs 320 (only one is shown in FIG. 11) extend between the platen 14 and the nozzle housing 34 and bias the nozzle housing 34 away from the platen surface 308. When the injection units are moved into engagement with the nozzle housing 34, further movement of the injection units toward the die 22 moves the nozzle housing 34 against the force of the springs 320 until the manifold nozzle 82 registers with the mold cavity inlet 26.

In another embodiment of the invention (not shown), the manifold is substantially identical to the manifold 30 of the apparatus 10. The manifold is mounted on the vertical surface 308 of the platen 14 by mounting columns that are substantially identical to the mounting columns 194 and 198 of the apparatus 10 but that are pivoted 90° so that the bolts 210 are threaded into the surface 308.

Figure 12:
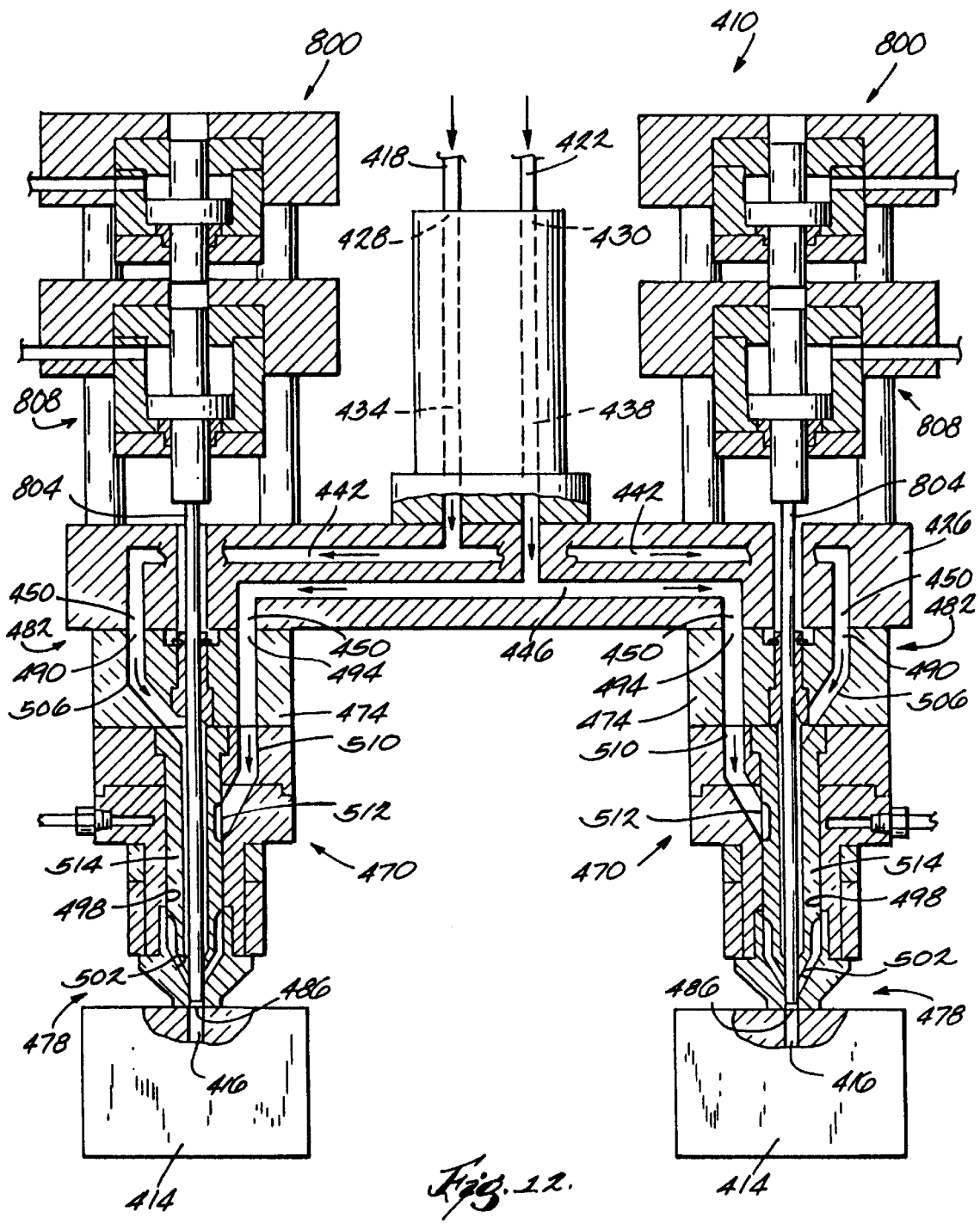
FIG. 12 is a top plan view in section of an injection molding apparatus that is another alternative embodiment of the invention.
Figure 13:
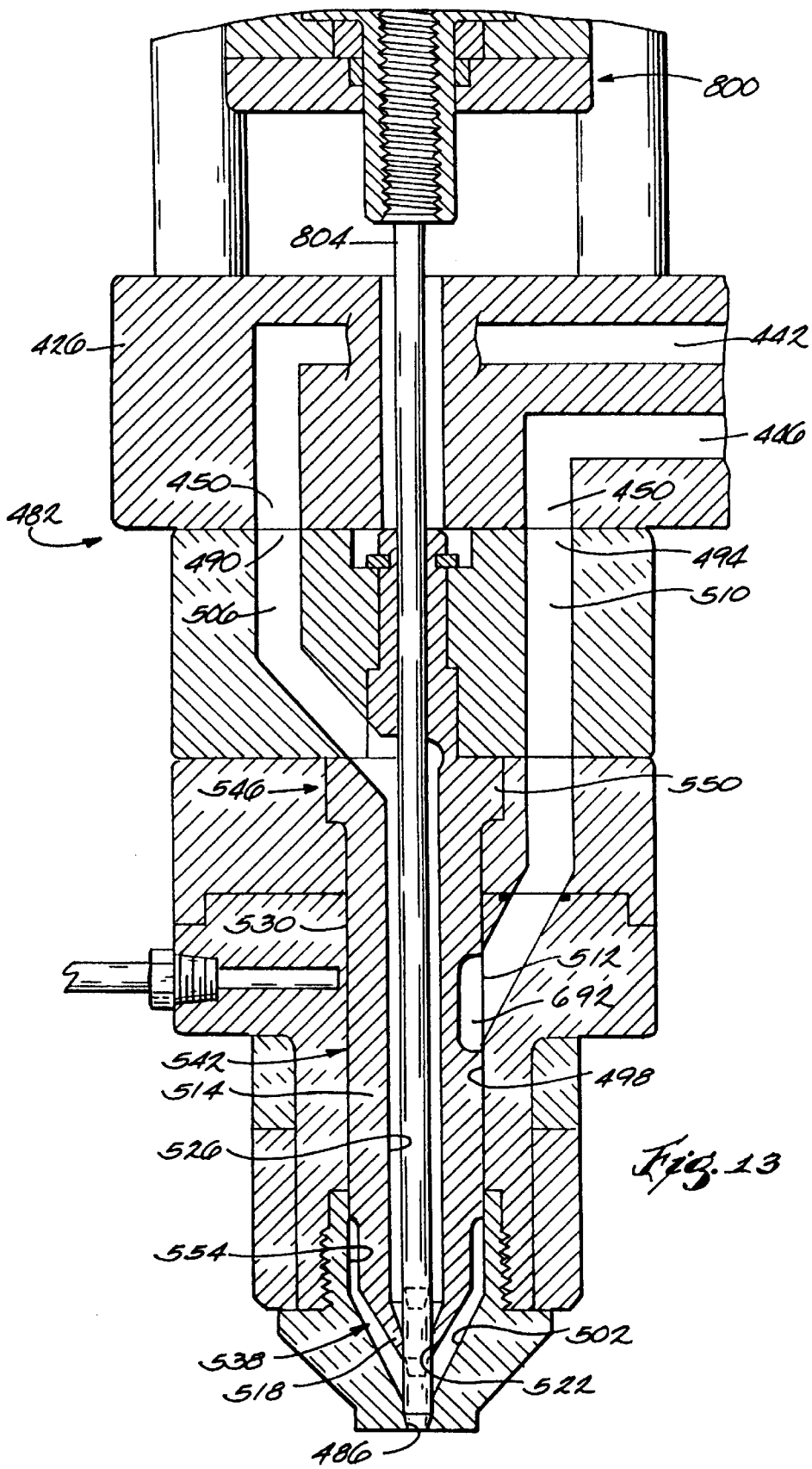
FIG. 13 is an enlarged view of a portion of FIG. 12.

FIGS. 12 and 13 illustrate an injection molding apparatus 410 that is another embodiment of the invention. The apparatus 410 is adapted for use with one or more injection molds 414 (shown schematically in FIGS. 12 and 13). In the illustrated construction, the apparatus is used with two molds 414 each having a single injection port 416. The molds 414 can have different sizes and/or shapes. The apparatus 410 can also be used with both multi-cavity molds having multiple injection ports and with molds having a single cavity and multiple injection ports or gates. The apparatus 410 is also adapted to be used in association with multiple sources of differing molten plastics, such as a pair of injection units (not shown) generating flows 418, 422 of a first material and of a second material.

The apparatus 410 includes a co-injection manifold 426 that is fixed relative to the mold 414 and conducts the multiple flows 418, 422 of molten plastic material to the injection ports 416. The manifold 426 has a pair of inlets 428, 430 for respectively receiving the flows 418, 422 of plastic material from an injector unit and has a pair of passages 434, 438 extending from the inlets 428, 430, respectively, for conducing the flows 418, 422 of molten material. The passages 434, 438 in the manifold 426 divide into multiple passage portions 442, 446, each of which terminates in a manifold outlet 450. The passage portions 442 conducting the first plastic material terminate in manifold outlets 450 which are located in proximity to manifold outlets 450 of passage portions 446 conducting the second plastic material. In short, the manifold 426 conducts the two differing plastic materials along separated paths from the injection unit to multiple pairs of manifold outlets 450 at which a flow 418 of the first material and a flow 422 of the second material exit the manifold 426 in close proximity to each other.

In the illustrated embodiment, the manifold 426 is constructed in a generally T-shaped configuration and has several components or blocks that are connected by conventional means. Those of ordinary skill in the art will readily understand, however, that the manifold 426 can take any of innumerable configurations in order to provide flow paths to the injection ports 416, and that the passage portions in the manifold 426 can again subdivide to conduct multiple flows of material. As discussed below, the apparatus 410 includes means for independently controlling the opening and closing of the flow paths communicating with the respective injection ports 416. As a result, the concerns of volumetric flow rates and pressures which vary from application to application and with the specific material used, can be accommodated for each injection port.

The apparatus 410 also provides a means 470 for conducting at least two flows 418, 422 of differing materials to multiple injector ports 416 and for introducing the flows 418, 422 to the injector ports 416 so that the materials are successfully co-injected. The means 470 for conducting and introducing the flows 418, 422 of material to the injection ports 416 includes a pair of nozzle housings 474, each nozzle housing 474 having forward and rearward ends 478, 482. While the illustrated nozzle housing 474 includes multiple portions fixed together, it should be understood that the housing 474 can be made of any number of portions or a single portion. Each nozzle housing 474 has an outlet 486 in its forward end, a first inlet 490 in the rearward end 482 of the housing 474, and a second inlet 494 in the rearward end 482 of the housing 474.

The nozzle inlets 490, 494 are each adapted to communicate with a respective manifold passage outlet 450 so that the inlets 490 receive the flow 418 of plastic material and the inlets 494 receive the flow 422 of plastic material. The nozzle housing outlet 486 communicates with the nozzle inlets 490, 494 in a manner discussed below and communicates with an injection port 416 in the injection mold 414.

Each nozzle housing 474 also has therein a generally cylindrical bore 498. The forward, downstream end 502 of the bore 498 communicates with the nozzle housing outlet 486. The nozzle housing 474 also includes a first nozzle passageway 506 that communicates between the first nozzle housing inlet 490 and the bore 498. The nozzle housing 474 also includes a second nozzle passageway 510 that communicates between the second nozzle inlet 494 and the bore 498 via an opening 512 intermediate the upstream and downstream ends of the nozzle bore 498.

Each nozzle housing 474 also includes a nozzle member 514 housed in the nozzle housing bore 498. The forward end 518 (FIG. 13) of the nozzle member 514 is spaced rearwardly from the nozzle housing outlet 486 and has therein (see FIGS. 13–15) an outlet port 522. The nozzle member 514 has therein a central bore 526. The forward end of the bore 526 (the lower end in FIG. 13) communicates with the outlet port 522. The rearward end of the bore 526 (the upper end in FIG. 13) communicates with the downstream end of the first nozzle passageway 506.

The nozzle member 514 has (see FIGS. 13–15) an outer surface 530 divided into three sections: the forward section 538; the middle section 542; and the rearward section 546. The rearward section 546 forms an annular flange 550 captured between the housing portions to secure the nozzle member 514 in the bore 498. The forward section 538 is located in the frustoconical portion of the housing bore 498 and is tapered at an angle of sixty degrees. The middle section 542 extends between the forward and rearward sections 538, 546.

Except as described below, the middle section 542 of the outer surface 530 is generally cylindrical and has a diameter substantially equal to the diameter of the nozzle housing inner surface such that there is a tight fit between the nozzle housing 474 and the middle section 542. As shown in FIG. 13, the forward section 538 and a forward portion of the middle section 542 are spaced from the inner surface of the nozzle housing 474 so as to define an annular passageway 554 which communicates between the second nozzle passageway 510 and the nozzle housing outlet 486 and which has a downstream end surrounding the outlet port 522. Between this annular passageway 554 and the downstream end of the second passageway 510, the middle section 542 of the nozzle member outer surface 530 has therein recesses or grooves or depressions which, along with the inner surface of the nozzle housing 474, provide a flow path for molten plastic from the second passageway. These grooves are described in greater detail below. It should be understood that the nozzle member 514 is symmetrical about a plane 690 shown in FIG. 15.

A rearwardmost groove 692 (FIGS. 13–15) is aligned with and communicates with the second passageway opening 512. The plane 690 bisects the groove 692. From the groove 692, and referring to FIG. 15, right and left grooves 694 and 696 extend forwardly (downwardly in FIGS. 14 and 15) and circumferentially on opposite sides of the nozzle member 514. Referring to FIG. 14, the right groove 694 extends circumferentially for about ninety degrees to a point 700, and then almost straight forwardly (downwardly in FIG. 14) a short distance to a point 702. The left groove 696 is a mirror image of the right groove 694 on the opposite side of the nozzle member 514.

At the point 702, the right groove 694 splits into (see FIG. 14) right and left branches 704 and 706. The right branch 704 extends forwardly and further circumferentially (approximately forty-five degrees from the point 702) around the nozzle member 514 to a point 714. The left branch 706 extends forwardly and circumferentially (approximately forty-five degrees from the point 702) in the opposite direction from the right branch 704 to a point 716. The points 714 and 716 are equidistant from the forward end of the nozzle member 514 and are spaced apart approximately ninety degrees circumferentially of the nozzle member 514. The ends of the right groove branches 704 and 706 flow into the above-described passageway 554. As shown in FIG. 14, the branches 704 and 706 define therebetween, on the outer surface 530 of the nozzle member 514, a generally heart-shaped land 720. As shown in FIG. 15, the outer surface of the land 720 is not cylindrical but is recessed at 722 so as to allow material flow between the branches 704 and 706.

On the opposite side of the nozzle member 514, the left groove splits into two branches (only one branch is shown in the drawings and is indicated by reference numeral 724 in FIG. 15). The branches 724 of the left groove 696 are mirror images of the branches 704, 706 of the right groove 694. Thus, the end points of the left groove branches 724 are, along with the end points 714 and 716 of the right groove branches 704, 706, equidistant from the forward end 518 of the nozzle member 514 and spaced apart approximately ninety degrees circumferentially of the nozzle member 514. (The end of the branch 724 is indicated by reference numeral 726 in FIG. 15.) The ends of the left groove branches 724 flow into the above-described passageway 554. The branches 724 of the left groove 696 define therebetween, on the outer surface 530 of the nozzle member 514, a generally heart-shaped land 730, the outer surface of which is visible in FIG. 15. Like the land 720, the land 730 is not cylindrical but is recessed at 732 so as to allow material flow between the left groove branches.

Between the ends of the groove branches 704, 706, 724 and the forward section 538 of the nozzle member 514, the outer surface 530 of the nozzle member 514 tapers outwardly (i.e., the diameter increases in the direction toward the forward end).

This construction of the grooves and the outer surface 530 of the nozzle member 514 creates a relatively even flow of material over the forward portion of the nozzle member 514 around the entire circumferential extent thereof. The material continues to flow through the annular passageway 554 defined between the nozzle member 514 and the nozzle housing inner surface until the material reaches the nozzle housing outlet 486.

The apparatus 410 also includes (see FIGS. 12 and 13) a valve pin assembly 800 associated with each nozzle housing 474 to control passage of the flows 418, 422 of the first and second materials through the nozzle housing outlets 486. Accordingly, the illustrated embodiment of the apparatus 410 includes a pair of valve pin assemblies 800. The valve pin assemblies 800 are identical, and each is fixed to a respective nozzle housing 474. Each valve pin assembly 800 includes a valve pin 804 which extends through the respective nozzle member central bore 526. The valve pin 804 is moveable (see FIG. 13) between a forward position (shown in solid lines in FIG. 13) an intermediate position (shown in phantom) and a rearward position (also shown in phantom). In the forward position, the valve pin 804 extends into and closes both the nozzle member outlet port 522 and the nozzle housing outlet 486, so that neither the outer skin or A material nor the inner core or B material flows through the nozzle housing outlet 486. In the intermediate position, the valve pin 804 is spaced from the nozzle housing outlet 486 but extends into and closes the nozzle member outlet port 522, so that only the outer skin or A material (which flows between the nozzle housing 474 and the outer surface 530 of the nozzle member 514) flows through the nozzle housing outlet 486. In the rearward position, the valve pin 804 is spaced rearwardly from both the nozzle housing outlet 486 and the nozzle member outlet port 522, so that the core or B material flows through the nozzle member outlet port 522 and through the nozzle housing outlet 486, and the outer skin or A material flows around the nozzle member 514 and surrounds the core material as both materials flow through the nozzle housing outlet 486. The valve pins 804 are moved relative to the housings 474 by respective conventional hydraulic cylinder assemblies 808 (see FIG. 12) mounted on the manifold 426. The valve pin assemblies 800 are independently operable so that the flows 418, 422 of the first and second plastic materials can be varied from nozzle housing to nozzle housing and, therefore, from injection port to injection port.

At the start of the machine cycle, all co-injection manifold pins 804 are in the forward or closed position. (Machine is in clamp open position.) On the machine the clamp then closes as the cycle begins. Injection then starts, one or more pins are moved to the intermediate position (selectable) to allow the A material to flow into the mold. A machine screw position measurement is then used to open or sequence the remaining pins 804. This allows the A material to flow into the remaining cavities. Once the A barrel achieves a previously entered setpoint position (selectable), the pins 804 are moved to the rearward position simultaneously on all manifolds. This allows the B material to enter all cavities.

When the B barrel screw position setpoint (previously entered) is achieved, the flow of the B material is stopped by the sequential movement of all manifold pins to the A material only or intermediate position. This stops the flow of B material to all cavities as the A material continues to fill out the part(s).

When the previously set Pack and Hold timer has timed out, all manifold pins are simultaneously moved to the forward or closed position thereby shutting off the flow of A material into the cavities.

Although this is the typical sequencing anticipated, there are other sequences that are possible. For example, certain manifold pins 804 could never be moved to the fully open or rearward position. This would allow for a single A material to fill a given cavity thereby making a mono-material part, while at the same time and within the same cycle other cavities have produced co-injected product. This allows a single co-injection machine to make not only multi-cavity parts (multiple cavitation of duplicate parts), but also multi-cavity family parts (multiple cavitation of unlike parts). With independent control of multi-drop manifolds, numerous combinations can be achieved.

Various features of the invention are set forth in the following claims.

We claim:

1. A method of co-injection molding, the method comprising the steps of
    (a) providing first and second mold cavities having respective inlets,
    (b) providing first and second first and second sources of material to be injected,
    (c) providing a co-injection manifold comprising a nozzle housing including a first outlet communicating with the first mold cavity inlet, a second outlet communicating with the second mold cavity inlet, first and second spaced apart inlets respectively communicating with the first and second sources of material to be injected, a first passageway communicating between the first inlet and the first and second outlets, and a second passageway communicating between the second inlet and the first and second outlets, (d) controlling the flow of the first and second materials through the first outlet and into the first mold cavity, and (e) controlling, independently of step (d), the flow of the first and second materials through the second outlet and into the second mold cavity.

2. A method as set forth in claim 1 wherein steps (d) and (e) include injecting different amounts of the first material into the first and second cavities.

3. A method as set forth in claim 2 wherein steps (d) and (e) include injecting different amounts of the second material into the first and second cavities.

4. A method as set forth in claim 1 wherein the first passageway has a first branch communicating with the first outlet and a second branch communicating with the second outlet, and wherein the second passageway has a first branch communicating with the first outlet and a second branch communicating with the second outlet.

5. A co-injection manifold comprising a nozzle housing having forward and rearward ends, the nozzle housing including a nozzle housing outlet which is located adjacent the forward end, first and second spaced apart inlets which are located adjacent the rearward end and which are respectively adapted to communicate with first and second injection nozzles, an inner surface defining a bore having a rearward upstream end and having a forward downstream end communicating with the outlet, a first passageway communicating between the first inlet and the upstream end of the bore, and a second passageway communicating between the second inlet and the bore at a point intermediate the upstream and downstream ends of the bore, the first and second passageways each having therein no turns with an angle greater than forty degrees and each intersecting the bore at an angle of no more than forty degrees, a nozzle member housed in the bore, the nozzle member having a forward end which is spaced rearwardly from the nozzle housing outlet and which has therein an outlet port, the nozzle member having therein a central bore communicating between the first passageway and the nozzle member outlet port, and the nozzle member having an outer surface portion spaced from the inner surface of the nozzle housing so as to define a passageway communicating between the second passageway and the nozzle housing outlet, and a valve pin extending through the central bore and being moveable between a forward position wherein the valve pin extends into and closes both the nozzle member outlet port and the nozzle housing outlet, an intermediate position wherein the valve pin is spaced from the nozzle housing outlet and extends into and closes the nozzle member outlet port, and a rearward position wherein the valve pin is spaced from both the nozzle housing outlet and the nozzle member outlet port.

6. A manifold as set forth in claim 5 wherein the first and second passageways each have therein no turns with an angle greater than approximately twenty-five degrees.

7. A manifold as set forth in claim 5 wherein the first and second passageways each intersect the bore at an angle of no more than approximately thirty-five degrees.

8. A manifold as set forth in claim 5 wherein the first and second passageways each have therein no turns with an angle greater than approximately twenty-five degrees and each intersect the bore at an angle of no more less than approximately thirty-five degrees.

9. A manifold as set forth in claim 5 wherein the first and second passageways each have therein only one turn, the one turn having an angle of approximately twenty-five degrees.

10. A manifold as set forth in claim 9 wherein the first and second passageways each intersect the bore at an angle of approximately thirty-five degrees.

11. A manifold as set forth in claim 5 wherein the nozzle housing includes a generally cylindrical inner surface defining the bore, wherein the bore is centered on an axis extending in a direction from the forward end to the rearward end, wherein the central bore extends along the axis, wherein passageway defined by the outer surface portion of the nozzle member and the inner surface of the nozzle housing is annular and surrounds the central bore, and wherein the nozzle member outer surface includes a land having an outer surface forming a portion of a cylinder, the land being located between the point and the nozzle housing outlet, being centered on the axis and being symmetrical about a plane including the axis, and the land having an axial length that decreases in a direction circumferentially away from the point at which the second passageway communicates with the bore.

12. A manifold as set forth in claim 11 wherein the nozzle member outer surface has therein, rearwardly of the land, a groove which is symmetrical about the plane, which has an axial length that decreases in a direction circumferentially away from the point at which the second passageway communicates with the bore, and which has a depth that decreases in a direction circumferentially away from the point at which the second passageway communicates with the bore.

13. Injection molding apparatus comprising a first mold cavity having an inlet, a second mold cavity having an inlet, a source of a first material to be injected, a source of a second material to be injected, a co-injection manifold including a nozzle housing including a first outlet adapted to communicate with the first mold cavity inlet, a second outlet adapted to communicate with the second mold cavity inlet, first and second spaced apart inlets respectively adapted to communicate with the sources of first and second material to be injected, a first passageway communicating between the first inlet and the first and second outlets, and a second passageway communicating between the second inlet and the first and second outlets, a first device for controlling the flow of the first and second materials through the first outlet and into the first cavity, and a second device for controlling, independently of the first device, the flow of the first and second materials through the second outlet and into the second cavity, whereby different amounts of the first material can be injected into the first and second cavities, and different amounts of the second material can be injected into the first and second cavities.

14. Apparatus as set forth in claim 9 wherein the nozzle housing includes first and second inner surfaces respectively defining first and second bores each having an upstream end and having a downstream end, the downstream end of the first bore communicating with the first outlet, the downstream end of the second bore communicating with the second outlet, wherein the first passageway communicates between the first inlet and the upstream ends of the bores, wherein the second passageway communicates between the second inlet and each of the bores at a point intermediate the upstream and downstream ends of the bores, wherein each of the first and second devices includes a nozzle member housed in the associated bore, the nozzle member having a forward end which is spaced rearwardly from the associated nozzle housing outlet and which has therein an outlet port, the nozzle member having therein a central bore communicating between the first passageway and the nozzle member outlet port, and the nozzle member having an outer surface portion spaced from the inner surface of the nozzle housing so as to define a passageway communicating between the second passageway and the associated nozzle housing outlet, and wherein each of the first and second devices includes a valve pin extending through the associated central bore and being moveable between a forward position wherein the valve pin extends into and closes both the associated nozzle member outlet port and the associated nozzle housing outlet, an intermediate position wherein the valve pin is spaced from the associated nozzle housing outlet and extends into and closes the associated nozzle member outlet port, and a rearward position wherein the valve pin is spaced from both the associated nozzle housing outlet and the associated nozzle member outlet port.

15. Injection molding apparatus comprising a first mold cavity having an inlet, a second mold cavity having an inlet, the second mold cavity being different from the first mold cavity in either size or shape, a source of a first material to be injected, a source of a second material to be injected, and a co-injection manifold including a nozzle housing including a first outlet adapted to communicate with the first mold cavity inlet, a second outlet adapted to communicate with the second mold cavity inlet, first and second spaced apart inlets respectively adapted to communicate with the first and second sources of material to be injected, a first passageway communicating between the first inlet and the first and second outlets, and a second passageway communicating between the second inlet and the first and second outlets.

16. Apparatus as set forth in claim 15 and further comprising a first device for controlling the flow of the first and second materials through the first outlet, and a second device for controlling, independently of the first device, the flow of the first and second materials through the second outlet.

17. Apparatus as set forth in claim 16 wherein the nozzle housing includes first and second inner surfaces respectively defining first and second bores each having an upstream end and having a downstream end, the downstream end of the first bore communicating with the first outlet, the downstream end of the second bore communicating with the second outlet, wherein the first passageway communicates between the first inlet and the upstream ends of the bores, wherein the second passageway communicates between the second inlet and each of the bores at a point intermediate the upstream and downstream ends of the bores, wherein each of the first and second devices includes a nozzle member housed in the associated bore, the nozzle member having a forward end which is spaced rearwardly from the associated nozzle housing outlet and which has therein an outlet port, the nozzle member having therein a central bore communicating between the first passageway and the nozzle member outlet port, and the nozzle member having an outer surface portion spaced from the inner surface of the nozzle housing so as to define a passageway communicating between the second passageway and the associated nozzle housing outlet, and wherein each of the first and second devices includes a valve pin extending through the associated central bore and being moveable between a forward position wherein the valve pin extends into and closes both the associated nozzle member outlet port and the associated nozzle housing outlet, an intermediate position wherein the valve pin is spaced from the associated nozzle housing outlet and extends into and closes the associated nozzle member outlet port, and a rearward position wherein the valve pin is spaced from both the associated nozzle housing outlet and the associated nozzle member outlet port.

18. A co-injection nozzle member having forward and rearward ends, the forward end of the nozzle member having therein an outlet port, the nozzle member having therein a central bore, the forward end of the bore communicating with the outlet port, the rearward end of the bore being adapted to communicate with a first source of material to be injected, the nozzle member having an outer surface, the outer surface having therein a rearwardmost groove adapted to communicate with a second source of material to be injected, the outer surface also having therein first and second grooves which extend forwardly and circumferentially on opposite sides of the nozzle member, each of the first and second grooves splitting into first and second branches, the first branch extending forwardly and further circumferentially around the nozzle member, the second branch extending forwardly and circumferentially in the opposite direction from the first branch.

19. A nozzle member as set forth in claim 18 wherein the first groove extends circumferentially for about ninety degrees before splitting into branches, the second groove being a mirror image of the first groove on the opposite side of the nozzle member.

20. A nozzle member as set forth in claim 18 wherein the ends of the branches are equidistant from the forward end of the nozzle member and are spaced apart approximately ninety degrees circumferentially of the nozzle member.

21. A nozzle member as set forth in claim 18 wherein the branches define therebetween, on the outer surface of the nozzle member, a generally heart-shaped land.

22. A nozzle member as set forth in claim 21 wherein the outer surface of the land is recessed so as to allow material flow between the branches.

* * * * *